United States Patent [19]

Kaewell, Jr. et al.

[11] Patent Number: 4,935,927

[45] Date of Patent: Jun. 19, 1990

[54] BASE STATION EMULATOR

[75] Inventors: John D. Kaewell, Jr., Philadelphia, Pa.; Scott D. Kurtz, Mount Laurel, N.J.

[73] Assignee: International Mobile Machines Corporation, Philadelphia, Pa.

[21] Appl. No.: 123,395

[22] Filed: Nov. 20, 1987

[51] Int. Cl.⁵ .............................................. H04J 3/06
[52] U.S. Cl. .................................. 370/105.1; 375/113; 455/51; 455/67
[58] Field of Search .......................... 370/29, 100, 103; 375/107, 76, 13, 113, 114, 58, 110; 455/244, 67

[56]  References Cited

U.S. PATENT DOCUMENTS

| | | | |
|---|---|---|---|
| 3,230,458 | 3/1962 | Stangeland | 455/244 |
| 4,253,188 | 2/1981 | Gable | 375/110 |
| 4,630,314 | 12/1986 | Smith | 455/52 |
| 4,637,036 | 1/1987 | Kobari | 375/76 |
| 4,675,863 | 6/1987 | Paneth et al. | 370/50 |
| 4,754,450 | 6/1988 | Lynk, Jr. et al. | 370/29 |
| 4,785,450 | 11/1988 | Bolgiano et al. | 370/95 |
| 4,788,681 | 11/1988 | Thomas et al. | 370/100 |

Primary Examiner—Benedict V. Safourek
Assistant Examiner—Tesfaldet Bocure
Attorney, Agent, or Firm—Arthur A. Jacobs

[57] ABSTRACT

A wireless digital telephone system containing at least one emulated base station plus one or more subscriber stations, the emulated base station comprising a station similar to the subscriber station but having the capability of initiating a synchronization process whereby it is enabled to assign time slots to the subscriber station within the frame pattern of an amplitude signal by means of monitoring for positive edges in the signal.

2 Claims, 6 Drawing Sheets

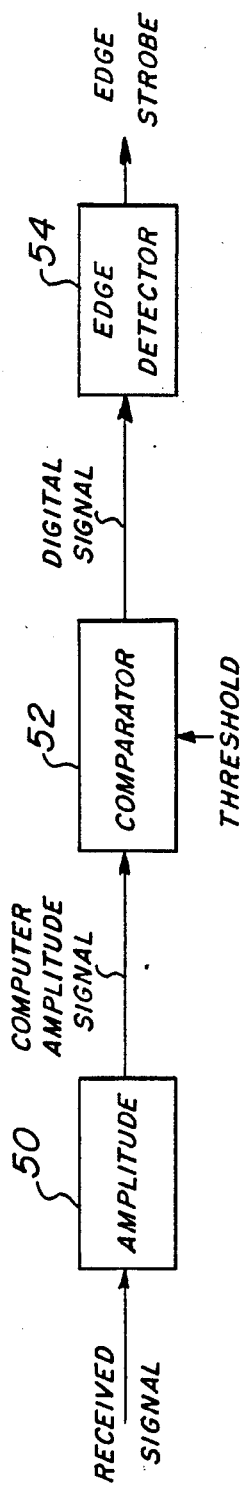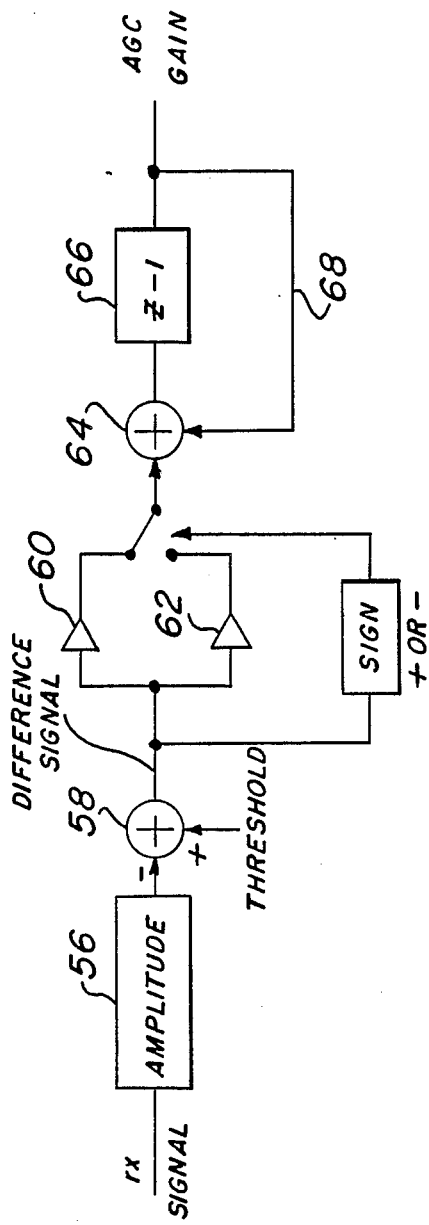

BASE STATION EMULATOR

BACKGROUND OF THE INVENTION

In general, present day telephone systems are increasingly using wireless technology for long distance calls and, in some instances, have begun the use of digital technology; however, no system in general use today has been capable of providing effective and efficient wireless digital technology for local calls to and from individual subscribers. Such technology has been disclosed in various recent patents commonly owned by the present applicants' assignee, as, for example, in U.S. Pat. No. 4,644,561, dated Feb. 17, 1987 and U.S. Pat. No. 4,675,863, dated June 23, 1987. The technology disclosed in these patents provides base stations in communication with both a central office and a plurality of subscriber stations utilizing digital wireless time division circuits wherein there are repetitive sequential slot positions in a transmit channel bit stream, each slot being associated with a particular subscriber.

The base stations used in the above time division system are relatively complex and expensive but economically feasible for a large system serving a large number of subscribers; however, for relatively small systems serving a relatively small number of subscribers it may be economically infeasible. In addition, such a system utilizes a pair of frequencies, one for transmission and one for reception, and, in view of the limited amount of channels available in the spectrum, it would be highly advantageous if only one frequency could be effectively used.

It is, therefore, an object, of the present invention to provide what may be called a simulated or emulated base station which can be effectively substituted for an actual base station in certain situations.

Another object is to provide a system that can be utilized for plural subscribers but which is operable on only a single frequency.

Other objects will become apparent from the following description and claims:

SUMMARY OF THE INVENTION

In essence, the system of the present invention utilizes what is, in effect, a modified subscriber station to act as a simulated or emulated base station, thereby considerably decreasing the total cost and complexity of the system. This emulated base station essentially differs from the subscriber station only in being able to initiate the synchronization process, whereas the subscriber unit only acts to scan the RF signals sent out by the emulated base station until it finds the frequency and slot assigned to it. In the intervals between transmissions of the RF signals the emulated base station is adapted to receive RF signals from the subscriber units. In this manner, the subscriber unit may either talk to the emulated base station which then acts as another subscriber station, or it may talk to another subscriber station that has been synchronized therewith by the emulated base station.

BRIEF DESCRIPTION OF THE DRAWINGS

FIG. 5 is a block diagram of the circuit for obtaining course synchronization in the present invention.

FIG. 6 is a block diagram of the received AGC circuit used in the present invention.

DETAILED DESCRIPTION OF THE PREFERRED EMBODIMENTS

Figure 1:
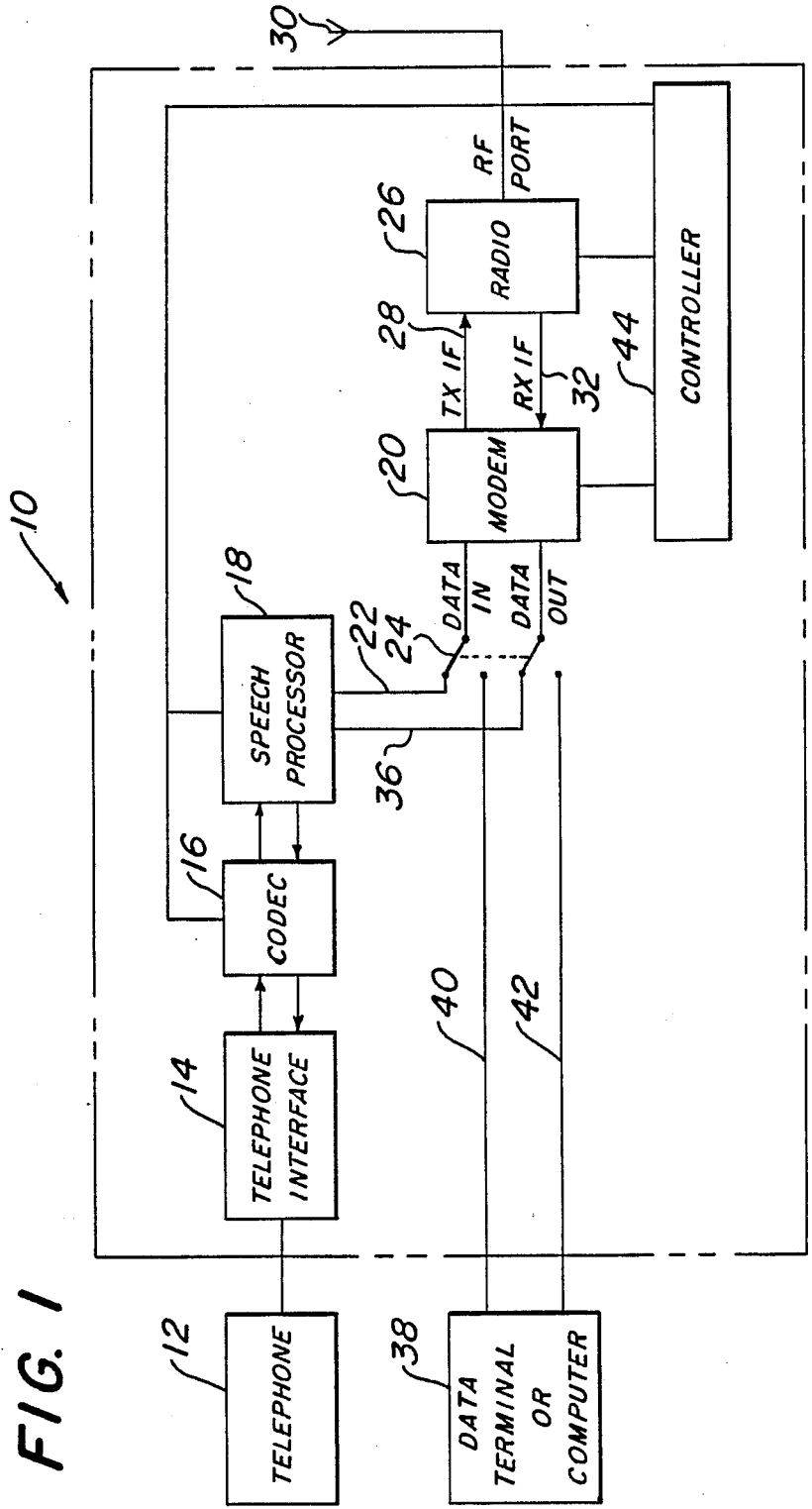
FIG. 1 is a block diagram showing an overall system embodying the present invention.

The overall internal operation of the system, generally designated 10, is shown in block diagram form in FIG. 1. In this system, during a telephone conversation, a person speaks into the telephone 12 and the speech signal is sent to the local telephone interface unit 14. The signal is digitized by the codec 16 and the resultant digital data stream is then fed to the speech processor 18 which compresses the speech data to a lower data rate. The compressed data is then fed to the modem 20 via line 22 and double-throw switch 24, the modem acting to convert the data stream to a spectrally efficient analog signal. This analog signal is fed to the radio 26 via line 28. The radio upconverts the signal to a radio frequency (RF) signal and then transmits this RF signal via the antenna 30.

In the intervals between transmissions of the RF signals, the unit is adapted to receive RF signals from a subscriber unit. The radio 26 downconverts each of these RF signals to an IF signal and feeds this IF signal to the modem 20 via line 32. The modem 20 demodulates the IF signal to form a digital signal which is then fed to the speech processor via switch 24 and line 36. The speech processor thereupon acts to expand the signal to a digitized speech signal and this digitized signal is then fed into the codec 16 which outputs an analog speech signal to the telephone 12 via the telephone interface 14.

The data transmission mode is similar to that described above except that the telephone is replaced by a data terminal or computer 38 and the telephone, codec and speech processor are bypassed by means of the alternate position of the switch 24 that is then coupled to the terminal 38 by lines 40 and 42.

The modem 20 and radio 26 are both coupled to a control unit 44. The control unit 44 is initially set to a predetermined slot, modulation and training mode for the modem and to a predetermined RF frequency and power level for the radio. However, these parameters can be adjusted by the subscriber unit in the event they are not adequate to provide a satisfactory reception at the subscriber station.

Figure 2:
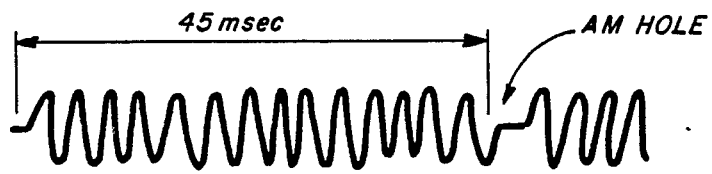
FIG. 2 is a diagrammatic illustration of the RCC waveform used in the standard base station.
Figure 3:
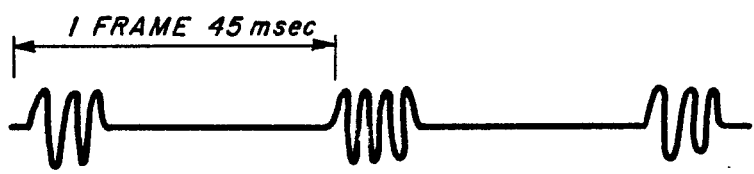
FIG. 3 is a diagrammatic illustration of the RCC waveform used in the present invention.

In a system utilizing an actual base station, such as, for example, the system described in the aforesaid U.S. Pat. No. 4,675,863, the transmitted waveform is divided into a multiplicity (i.e. 45) msec. frames. Each frame is, in turn, divided into four 11.25 msec. slots. The base station transmits on all four slots to produce a 100% duty cycle modulation waveform, the lone exception being the radio control channel (RCC). The RCC slot is slightly shorter than 11.25 msec and this causes a small gap in the modulation at the beginning of every frame. This gap is known as an AM hole. A diagram of the waveform of the RCC channel in the actual base station format is shown in FIG. 2. In the system of the present invention, however, there is no transmission of a 100% duty cycle waveform. Instead, there is a transmission on only one slot per frame (a 25% duty cycle waveform), as shown in FIG. 3. This modified frame format necessitates changes in coarse synchronization, automatic gain control (AGC) and frequency acquisition. These changes are indicated in the following description:

Coarse Synchronization

Figure 4:
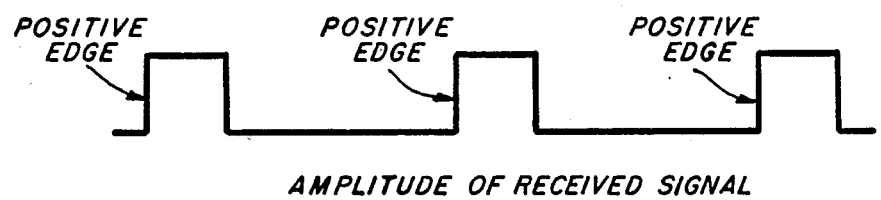
FIG. 4 is a diagrammatic illustration showing the positive edges of the amplitude of the received signal used in course synchronization of the present invention.

Since the system of the present invention utilizes only a 25% duty cycle waveform, it monitors the amplitude of the received signal and searches for positive edges in the amplitude signal. These positive edges are illustrated in FIG. 4. The subscriber unit adjusts its frame timing to align with the occurrence of these positive edges.

The circuit for obtaining the above type of coarse synchronization is shown in block diagram form in FIG. 5 where the received signal is shown as being fed into an amplitude computation device 50 which produces a computer amplitude signal that is then passed to a comparator 52 where it is compared to a predetermined threshold signal, thereby forming a digital signal (1=signal present, 0=no signal present). This digital signal is fed into an edge detector 54 that outputs a strobe to indicate the detection of a positive edge.

AGC

The 25% duty cycle modulation requires a distinct type of receive AGC circuit which avoids tracking when there is no signal present. A slow rise fast decay AGC is, therefore, provided. This is shown in FIG. 6 where the received signal is fed into an amplitude computation device 56, which may take the form of a preprogrammed ROM, from which a resulting amplitude signal is fed into a comparator 58 in which it is subtracted from a predetermined threshold value to form a difference signal. This difference signal is fed through one of two scaling multipliers, shown at 60 and 62, into a low pass filter comprising an adder 64 and a delay means 66 connected through a loop 68. One or the other of the two multipliers is used in accordance with the sign of the difference signal. If the difference signal is positive, the slow decay in the AGC control signal is implemented. If the difference signal is negative, a fast rise in the AGC control signal is implemented. The output of the filter is the gain signal which is then fed to the gain control unit 44 shown in FIG. 1.

Coarse Frequency Acquisition

Figure 7:
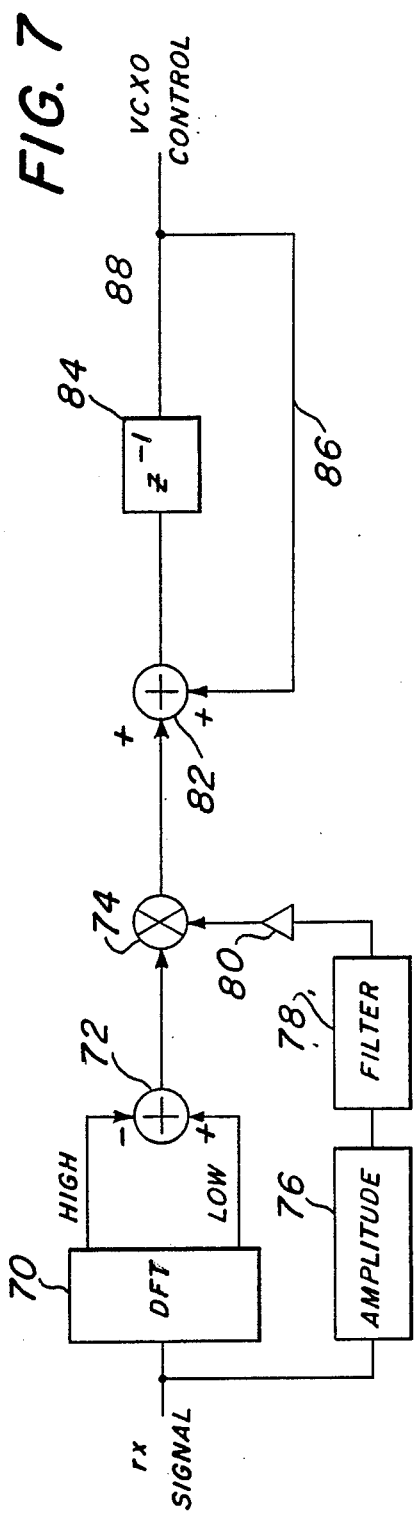
FIG. 7 is a block diagram showing the frequency acquisition circuit used in the present invention.

Since in the 25% duty cycle frame format it is not required to perform frequency acquisition during the off time (75% null time) and since the frame timing is not known at the time when frequency acquisition is performed, a modified form of frequency acquisition circuit has been provided, as shown in FIG. 7. In this circuit the received signal is fed into a Discrete Fourier Transform (DFT) computation device 70 which outputs the high band energy (energy in the frequency band above the center frequency) and the low band energy (energy in the frequency band below the center frequency). The high band energy output is subtracted from the low band energy output at the adder 72 and the output thereof is fed to a mixer or multiplier 74. The received RF signal is also passed to a stripping means 76 which strips off the sign of the signal (negative or positive), thereby determining only the amplitude of the signal. The stripped signal is then fed to a filter 78 which smooths the signal by averaging it out. The output from the filter 78 is fed, via amplifier 80, to the multiplier 74.

The primary purpose of the circuit through 76, 78, and 80 is to prevent the action of noise on the output signal while accentuating the signal itself. In this respect, since noise generally has a small amplitude, it is effectively filtered out during the smoothing process. On the other hand since the actual signal generally has a relatively large amplitude it is, in effect, highlighted by adding the smoothed or filtered signal to the mixer 74.

The scaled signal leaving the mixer 74 is balanced between the high and low energy frequencies, and this balanced signal, that is proportional to the short term average amplitude of the received signal, is fed into a lowpass filter comprising an adder 82, and a delay means 84 which are looped at 86. The delay means 84 causes the output signal 88 to the YCXO control to represent the output immediately prior to the output actually fed into the lowpass filter. The VCXO control is used to adjust the frequency of the master oscillator in the system.

After initial or course synchronization has been effected, the system is in an idle voice mode but is fully set up for voice operation. If the phone at either end goes off-hook, the phone at the other end will ring until the ringing phone is answered or the initiating phone goes on-hook.

The calls are set up by a voice code word (VCW) at the beginning of every voice slot, this code word indicating an off-hook condition at the initiating station. When this occurs, the station acting as an emulated base station then appears to itself go off-hook to the central office (CO) thereby making a connection to the central office. The initiating subscriber station then proceeds to complete the call by dialing the desired number. When the initiating subscriber unit goes on-hook, the emulated base station is so informed by the VCW and presents an on-hook appearance to the central office.

When the emulated base station detects a ring signal from the central office, the subscriber unit is caused to ring by means of the corresponding vCW from the emulated base station. When the subscriber unit thereafter goes off-hook, the emulated base station is so informed via the corresponding vCW and it then presents an off-hook appearance to the central office.

Figure 8:
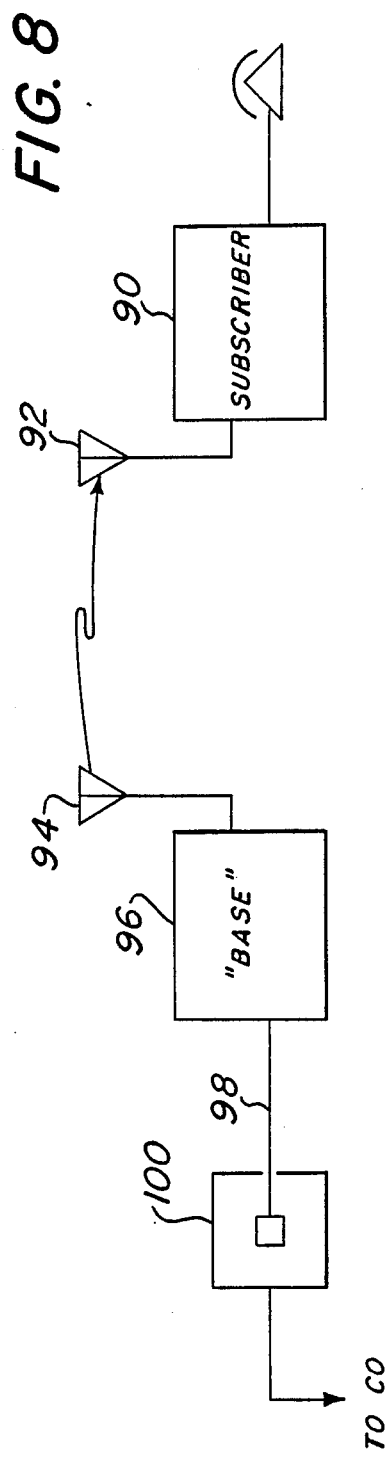
FIG. 8, is a diagrammatic illustration of a wireless phone system configuration embodying the present invention.

The above type of wireless phone system configuration is exemplified in FIG. 8 where the subscriber unit 90 is shown in wireless communication via antennas 92 and 94 with the emulated base station 96. The station 96 is in wireline communication via line 98 and interface 100 with the central office.

Dual Subscriber System

Figure 9:
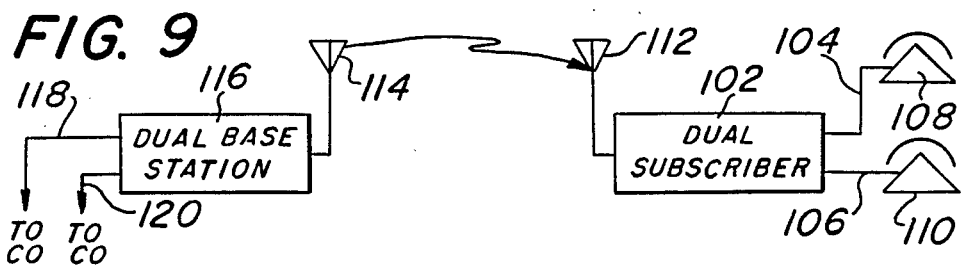
FIG. 9 is a diagrammatic illustration similar to FIG. 8 but showing a dual subscriber system.

The above-described system can be employed with a dual subscriber arrangement as shown in FIG. 9. In this system each channel is capable of supporting two complete conversations without the necessity of using a duplexer. In this respect, a dual subscriber unit 102 is connected by wires 104 and 106 to a pair of subscriber telephone sets 108 and 110. The subscriber unit 102 is in wireless communication via antennas 112 and 114 with an emulated dual base station 116. The unit 116 is connected to the central office by wire lines 118 and 120.

Figure 10:
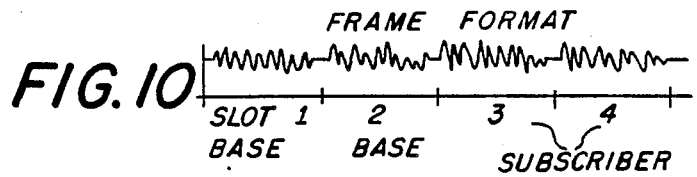
FIG. 10 is a diagrammatic illustration of the frame format of the dual subscriber system of FIG. 9.

The two separate subscribers 108 and 110 utilize a time slot arrangement, such as disclosed in the aforesaid U.S. Pat. No. 4,675,863, wherein each subscriber is assigned a separate slot. The frame format for this arrangement is shown in FIG. 10 where four slots are shown, numbered 1, 2, 3 and 4. The first two slots are used for the emulated base station and the last two are used for the two subscribers.

Figure 11:
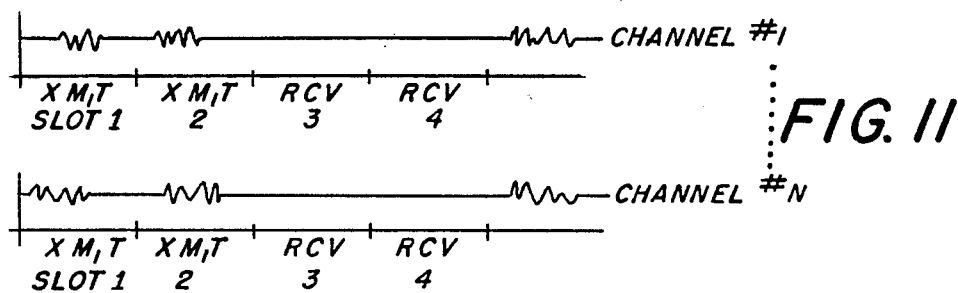
FIG. 11 is a diagrammatic illustration of the frame format of a plurality of dual subscriber systems.

A plurality of dual subscriber systems may be operated on different channels without duplexers by synchronizing all of the emulated base station transmissions. This is illustrated by the frame format shown in FIG. 11 where channel 1 is shown above and channel n (indicating any desired number of channels in between) is shown below. On each channel, the first two slots are for transmission and the last two are for reception.

Paged Remote Service

One emulated base station may be used with a plurality of different subscribers, one at a time. In such arrangement, for reception, the subscribers continuously monitor the transmissions of the radio control channels (RCC), described more fully in the aforesaid U.S. Pat. No. 4,675,863, until a particular subscriber is paged by the emulated base station by means of the subscriber's ID Number (SID). After receiving a page, the subscriber initiates a transmission back to the emulated base station using the synchronization process described above. For initiating a call, the subscriber transmits on the RCC using the previously described synchronization process.

Monitoring Function

Figure 12:
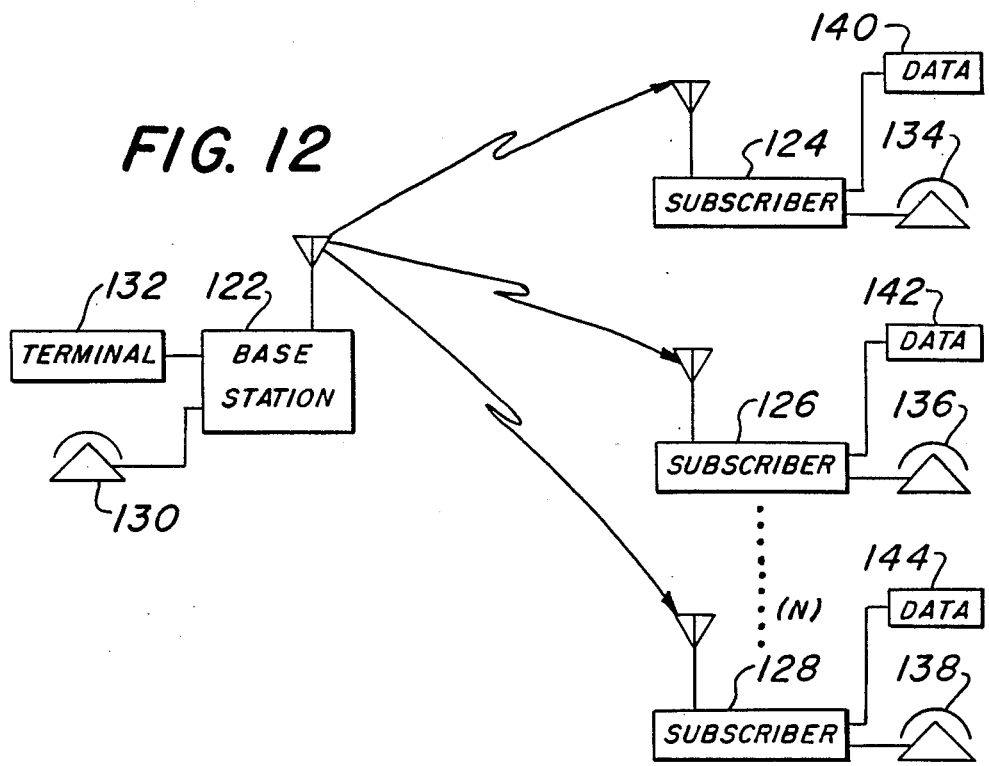
FIG. 12 is a diagrammatic illustration of a system embodying the present invention which is used for monitoring one or more functions.

The present system may be used for monitoring one or more functions. In this respect, using a computer as a controlling/data logging device, a plurality of subscribers may be periodically polled to report on some function such as temperature, weather conditions, security, water/flood warnings, low fuel warnings, remote gas, electric or water meter readings, etc. This is illustrated in FIG. 12 where an emulated base station 122 is in wireless communication with a plurality of subscriber units respectively designated 124, 126 and 128. The unit 122 is in wire line connection with both a telephone 130 for voice communication and a computer or data terminal 132 for data input. Similarly, each subscriber unit is connected both to a respective telephone 134, 136 or 138 for voice communication and to a data device, as at 140, 142 or 144 respectively.

Repeater System

Figure 13:
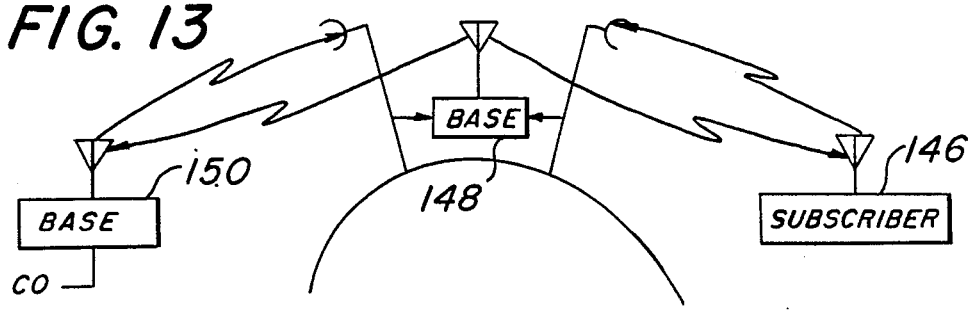
FIG. 13 is a diagrammatic illustration of a repeater system embodying the present invention.

An important use of the present system is as a repeater to extend the range of the system. In this arrangement, the emulated base station may be used to overcome interfering obstacles such as mountains and the like. FIG. 13 illustrates this function, showing a subscriber unit 146 in wireless communication with an emulated base station 148 on the summit of a mountain. The unit 148 is also in wireless communication with a standard base station 150 connected to a central office.

Figure 14:
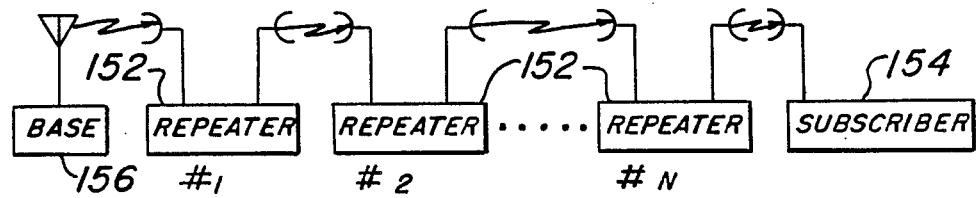
FIG. 14 is a diagrammatic illustration of a system embodying the present invention utilizing multiple repeaters.

The relative simplicity and inexpensiveness of the emulated base station makes it very cost effective as a repeater unit. It can also be used as a repeater to extend the long distance range of the system regardless of the presence or absence of obstructions. By utilization of the time slot arrangement, the repeater unit, without the use of any duplexer, fits into the complete system while remaining transparent to both the standard base station and the subscriber. It can, of course, also be interposed between the subscriber and another emulated base station instead of a standard base station. This can be provided in multiple stages from one emulated base station to another to greatly increase the range of the system in a relatively inexpensive manner. This is illustrated in FIG. 14 where a series of repeater units 152 are interposed between the subscriber 154 and the base station 156.

In addition to extending the range of the system, the repeater unit serves to clean up the actual base station signal via equalization before retransmission to the subscriber.

Figure 15:
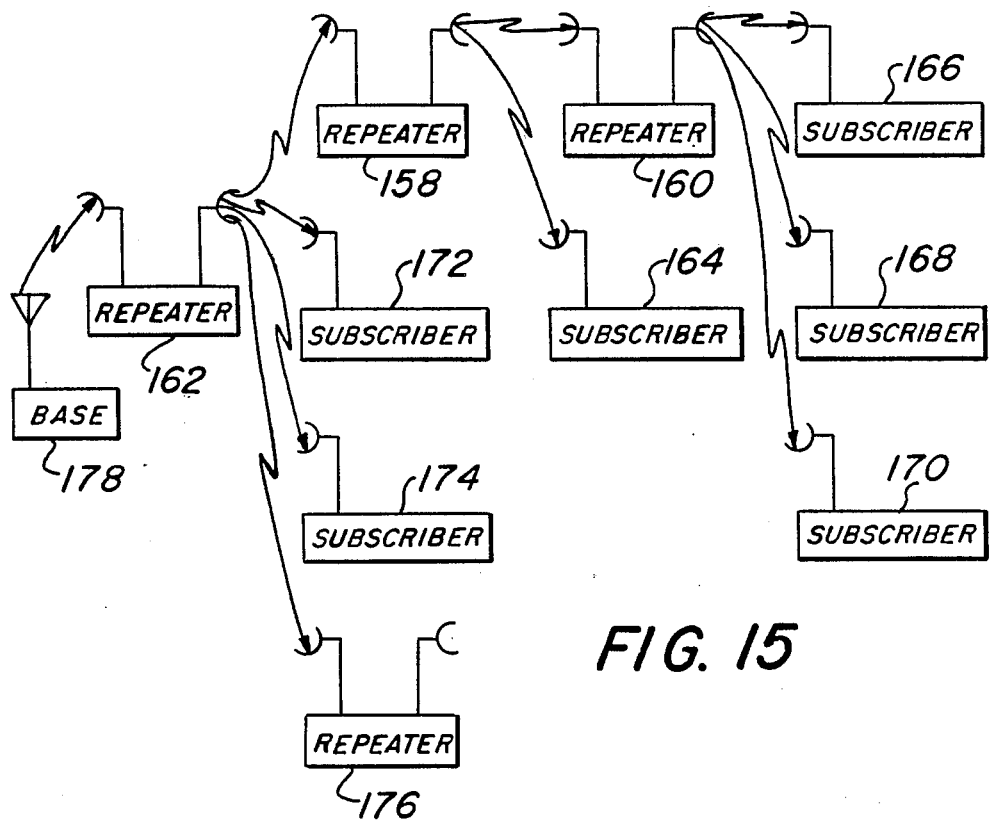
FIG. 15 is a diagrammatic illustration of a system embodying the present invention where a single repeater is used to drive a plurality of other repeaters as well as subscriber units.

One repeater can also be used in what may be termed a repeater star system to drive multiple repeaters and/or subscribers. This is illustrated in FIG. 15 where the single repeater unit 158 is in wireless communication with ancillary repeaters 160 and 162 as well as with one or more subscribers such as at 164. The ancillary repeaters are themselves in wireless communication with subscribers such as shown at 166, 168, 170, 172 and 174 as well as with other ancillary repeaters such as at 176. Any one of the ancillary repeaters, such as repeater 162, may be used as the final repeater in direct communication with the base station indicated at 178.

Multiple repeaters may be placed at one location, on different channels and synchronized so that their transmissions and receptions occur simultaneously, thereby avoiding the use of duplexers. In such a configuration, a master repeater is used to monitor the RCC channel of the base station and relays the monitored information to the various subscribers via the emulated base station's RCC. In such a configuration, on call setup, the subscribers are each assigned a repeater channel.

We claim:

1. In a wireless digital communication system that includes at least two stations in RF communication with each other and wherein one station initiates the timing of RF signals and the other station synchronizes its timing in accordance with the initiated timing, a synchronization means at said other station comprising a course frequency acquisition circuit, said circuit comprising
    computation means which separates the signal received from said one station into high band and low band energy frequencies;
    means to subtract the high band energy output from the low band energy output to obtain a resultant signal;

means to strip off the sign of the resultant signal to determine only the amplitude thereof;

means to accentuate the stripped signal while substantially filtering out noise; and means to feed the stripped signal to a voltage controlled crystal oscillator (VCXO) which provides the timing at said other station.

2. A wireless digital telephone system comprising at least two stations including a first station and a second station in communication with each other by means of RF frequency signals, said RF frequency signals comprising waveforms divided into a multiplicity of time frames, each frame comprising a single time slot;

a control means at each station;

amplitude monitoring means at each station that is controlled by said control means to monitor the amplitude of signals from another station and to determine the location of positive edges in the waveforms of such signals by comparing the amplitude of each signal from another station with a predetermined threshold signal;

frame adjustment means at each station that is controlled by said control means to adjust the frame timing therein to align the frames with occurrences of the positive edges;

said first station having frame synchronization initiating means and said second station having frequency acquisition means to synchronize the timing of signals received from said first station with the timing initiated by said first station;

said first station differing essentially from said second station only by the inclusion in said first station of said synchronization initiating means;

said system further including a slow rise, fast decay automatic gain control (AGC) circuit that avoids tracking in the absence of a signal, said circuit comprising an amplitude computation means into which a received signal is fed and which outputs an amplitude signal;

a comparator for receiving said amplitude signal and subtracting it from a predetermined threshold value to form a difference signal; and means to determine the positive or negative sign of said difference signal to selectively implement a slow decay or a fast rise in the AGC signal; and means to feed the implemented signal to said control means.

* * * * *